United States Patent [19]
Dixon

[11] Patent Number: 5,532,873
[45] Date of Patent: *Jul. 2, 1996

[54] SCANNING BEAM LASER MICROSCOPE WITH WIDE RANGE OF MAGNIFICATION

[76] Inventor: Arthur E. Dixon, 601 Stonebury Crescent, Waterloo Ontario N2K 3R2, Canada

[ * ] Notice: The term of this patent shall not extend beyond the expiration date of Pat. No. 5,532,873.

[21] Appl. No.: 117,797

[22] Filed: Sep. 8, 1993

[51] Int. Cl.$^6$ .................................................. G02B 21/06
[52] U.S. Cl. ........................... 359/388; 359/368; 359/385
[58] Field of Search .......................... 359/368, 372–374, 359/377, 379, 381, 385–389, 660; 356/72, 318, 326, 417, 127, 376; 250/201.3, 216, 234

[56] References Cited

U.S. PATENT DOCUMENTS

| | | | |
|---|---|---|---|
| 4,403,835 | 9/1983 | Reichel | 359/383 |
| 5,035,476 | 7/1991 | Ellis et al. | 359/368 |
| 5,159,492 | 10/1992 | Hayashi | 359/660 |
| 5,192,980 | 3/1993 | Dixon et al. | 356/326 |
| 5,381,224 | 1/1995 | Dixon et al. | 356/72 |

OTHER PUBLICATIONS

"Layer Scan System Selecta", Helles Const Catalogue, 1995/1996; pp. 18-2–18-6.
"Modern Len Design", Smith, McGraw–Hill, 1992, pp. 411–413.
Moore & Miner, "A Spatially Resolved Spectrally Resolved PL Mapping System", J. Crystal Growth 103, 21–27 (1990).
G. E. Carver, "Scanned Photoluminescence with . . . ", Semicond. Sci. Technol. 7, A53–58 (1992).
G. S. Kino, "Efficiency in Nipkow Disk Microscopes" in The Handbook of Biological Confocal Microscopy, 93–99 (1989).
B. A. Oliver & A. E. Dixon, "Laser Beam Induced Current easurements . . . ", Can. J. Phys. 65, 814–820 (1987).
Moore, Hennessy, Bajaj & Tennant, "Finding Faults in Focal Plane Arrays", Photonics Spectra, p. 161, Sep., 1988.
H. J. Hovel, "Scanned Photoluminescence of Semiconductors", Semicond. Sci. of Technol. 7, A1–A9, 1992.

*Primary Examiner*—Thong Q. Nguyen

[57] ABSTRACT

A new confocal scanning beam laser microscope or imaging system is disclosed which has a very wide range of magnification, which allows a small area of a specimen to be imaged at submicron resolution at high magnification, and a large area of the specimen, up to several centimeters in size, at lower resolution. The optical arrangement of a confocal scanning beam laser microscope is used to produce high resolution images of a small area of the specimen, using a microscope objective that is not telecentric. A telecentric laser scan lens is interchanged with the optical subassembly of the microscope comprised of the microscope objective and unitary telescope above it, such that the scanning beam now passes through the telecentric laser scan lens to produce lower resolution images of a much larger area of the specimen, and the imaging system acts as a confocal scanning beam macroscope. Several different embodiments are disclosed, with contrast mechanisms that include reflected light, fluorescence, photoluminescence, and optical beam induced current. A method for parfocalizing a microscope objective and a laser scan lens for use in the imaging system is also disclosed.

9 Claims, 6 Drawing Sheets

SCANNING BEAM LASER MICROSCOPE WITH WIDE RANGE OF MAGNIFICATION

TECHNICAL FIELD

This invention relates to the fields of scanning laser microscopy and scanning laser imaging or mapping systems, using many different contrast mechanisms, including Optical Beam Induced Current, reflected light, photoluminescence, fluorescence, etc. More particularly, this invention relates to any field of scanning optical microscopy in which a very wide range of magnification is required, for example when it is important to be able to image large specimens, and then examine small areas of these specimens at very high magnification and resolution.

BACKGROUND OF THE INVENTION

When specimens are larger than about 1 mm by 1 mm in size, and imaging must be accomplished by point-by-point measurements across the specimen, such measurements are often made using scanning stage laser microscopes. In scanning stage laser microscopes, the sample is moved in a raster scan under a stationary focused laser beam. Such microscopes have good spatial resolution, and can image both large and small specimens, but are slow. Because of this ability to image large specimens, scanning stage microscopes are frequently used for recording Optical Beam Induced Current (OBIC) or Optical Beam Induced Voltage images or maps of semiconductor materials and devices. An early scanning stage OBIC microscope was described by Oliver and Dixon[1], and the use of such a microscope for OBIC imaging of infrared focal plane arrays was described by Moore[2] et al. Scanning stage microscopes have also been used for photoluminescence (PL)imaging or mapping of semiconductor devices and wafers, as described by Hovel[3] and by Moore and Miner[4]. If a scanning stage microscope is optimized for imaging large specimens, the stage must move large distances very quickly, and this is incompatible with the precision movement required for high resolution imaging of small areas on the same specimen. Some scanning stage mapping systems attempt to overcome this disadvantage by mounting small, high resolution stages on top of large, high speed low resolution stages, so that both high resolution, small-area scans can be accomplished as well as rapid, low resolution large-area scans. This technique has several disadvantages: the two sets of stages require separate controllers, and four stages are required, adding extra cost, and the high resolution stages add extra mass that must be moved by the high speed, low resolution stages.

Another technique for recording high resolution PL images of large semiconductor specimens is described by Carver[5], who uses a scanning beam to record high resolution images of a 250 micron by 250 micron area, and then translates the specimen to image other areas. Because this technique measures PL across the whole specimen at high resolution, it results in very large data files and is slow.

[1]B. A. Oliver and A. E. Dixon, "Laser beam induced current measurements of minority carrier diffusion length", Canadian Journal of Physics 65, 814–820, 1987.
[2]C. J. L. Moore, J. Hennessy, J. Bajaj, and W. E. Tennant, "Finding Faults in Focal Plane Arrays", Photonics Spectra, p.161, September 1988.
[3]H. J. Hovel, "Scanned photoluminescence of semiconductors", Semicond. Sci. Technol. 7, A1–A9, 1992.
[4]C. J. Moore and C. J. Miner, "A Spatially-Resolved Spectrally-Resolved Photoluminescence Mapping System", J. Crystal Growth 103, 21–27, 1990.
[5]G. E. Carver, "Scanned photoluminescence with high spatial resolution in semi-insulating GaAs and InP", Semicond. Sci. Technol. 7, A53–A58, 1992.

Figure 1:
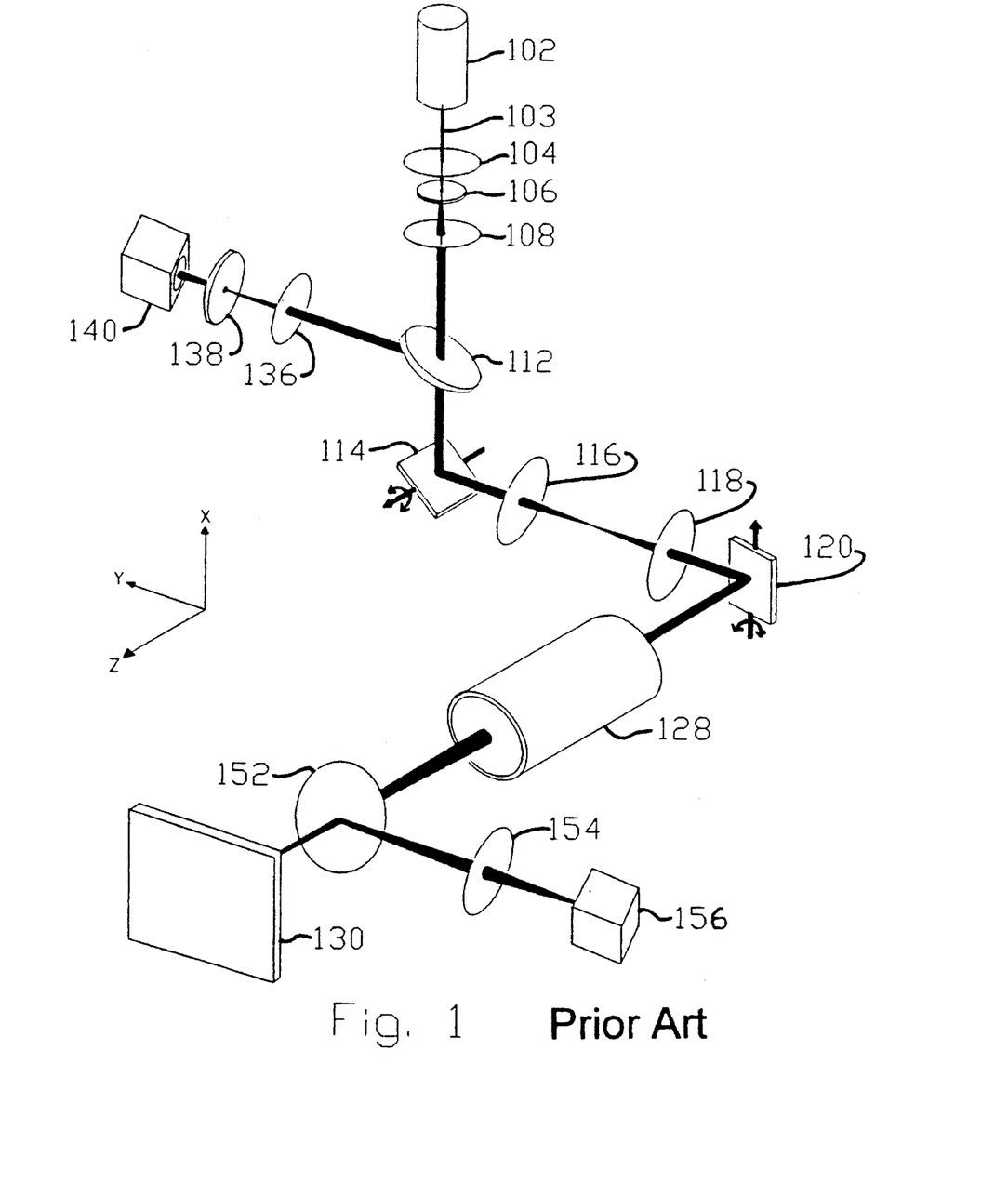
FIG. 1 shows a simplified perspective view of a prior art scanning beam laser macroscope that includes both confocal and non-confocal detectors.

A prior art scanning beam imaging system for macroscopic specimens (a macroscope) was described by Dixon and Damaskinos[6], and one embodiment is shown in FIG. 1. This scanning-beam system includes a confocal detector for reflected light or fluorescence imaging, and an additional non-confocal detector, usually used for reflected light or photoluminescence imaging. A large scan area is achieved by using a telecentric laser scan lens instead of a microscope objective. Laser beam 103 from laser 102 passes through a beam expander and spatial filter comprised of lens 104, pinhole 106 and lens 108, and is expanded to match the size of the entrance pupil of laser scan lens 128 (the laser scan lens used in this embodiment is a telecentric f*theta lens with a flat focal plane). The beam is deflected in the X-Y plane by first scanning mirror 1141, which rotates about an axis parallel to the Z-direction. Lens 116 of focal length f1 is placed a distance f1 from scanning mirror 114. Lens 118, of focal length f1, is placed a distance 2f1 from lens 116, and a distance f1 from scanning mirror 120. This brings the scanning beam back to the center of second scanning mirror 120 as a parallel beam. Second scanning mirror 120 rotates about an axis parallel to the X-direction, and imparts a deflection in the Y-Z plane. Laser scan lens 128 is placed such that the center of it's entrance pupil coincides with the center of scanning mirror 120, and it focuses the incoming scanning beam through beamsplitter 152 to a diffraction-limited spot in macroscopic specimen 130. Light reflected, scattered or emitted from the focus spot in the specimen travels back toward laser scan lens 128, and part of this returning light is reflected by beamsplitter 152 towards condenser lens 154 and detector 156 so that a non-confocal image can be obtained using detector 156. Part of the light transmitted by beamsplitter 152 is collected by laser scan lens 128, passes back through the scan system, and is partially reflected by beamsplitter 112 toward lens 136, pinhole 138 (at the focal point of lens 136) and detector 140. Only light which is part of a parallel beam entering lens 136 will be focused to pass through pinhole 138 and be detected. Thus the combination of lens 136, pinhole 138 and detector 140 act as a confocal detector, detecting only light originating at the focus spot in specimen 130, and rejecting light from any other point. This allows the macroscope to perform optical image slicing. The signal from detector 140 (or detector 156) is digitized using a frame grabber 160 as the raster scan proceeds, and the image is displayed on a high resolution computer screen 162. For low resolution, large area OBIC images, OBIC amplifier 158 (current-to-voltage converter) is attached to the specimen to measure OBIC, and the output signal from the OBIC amplifier is digitized and displayed. The macroscope does an excellent job of imaging large specimens, but its zoom capability is limited by the small numerical aperture (NA) of the laser scan lens, which results in a spot size that is large compared to that used in a confocal scanning laser microscope.

[6]A. E. Dixon and S. Damaskinos, "Scanning Laser Imaging System", U.S. Patent Application, August 1993.

Figure 2:
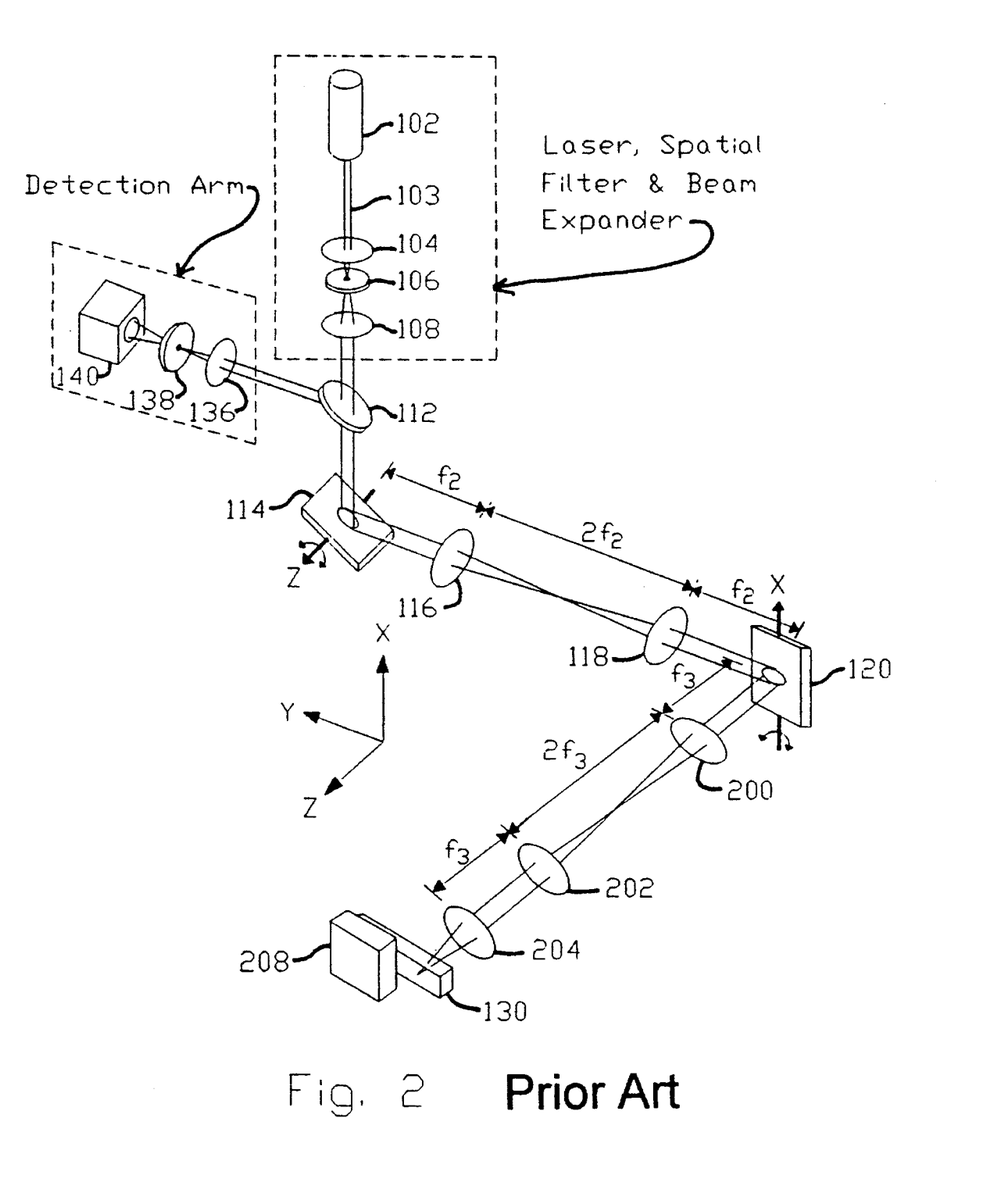
FIG. 2 shows a simplified perspective view of a prior art infinity-corrected scanning beam confocal laser microscope.

When specimens are smaller than about 1 mm by 1 mm, a scanning beam laser microscope is often used to image the specimen using reflected light, fluorescence, photoluminescence, OBIC, and other contrast mechanisms. A prior art confocal scanning beam microscope is shown in FIG. 2. In this microscope, a light beam 103 from laser 102 passes through a spatial filter and beam expander comprised of lens 104, pinhole 106 and lens 108. The beam passes through beamsplitter 112 and through a scan system comprising first scanning mirror 114, lenses 116 and 118, second scanning mirror 120, and lenses 200 and 202, as shown. This results in a scanning beam that enters microscope objective 204 with the beam crossing the optic axis of the microscope at the position of the entrance pupil of microscope objective 204, which focuses the beam to a diffraction-limited spot in specimen 130. The position of the focal plane is changed by moving focusing stage 208 in the axial (Z) direction. Light reflected, scattered or emitted from the specimen is collected by the microscope objective, travels back through the scan system (and is descanned), and is partially reflected by beamsplitter 112 into the confocal detection arm comprised of lens 136, pinhole 138, and detector 140, and is detected. For high resolution OBIC measurements, an optical beam induced current amplifier (current-to-voltage converter) is connected to the specimen, and OBIC contrast is displayed on the microscope's computer screen. Scanning beam laser microscopes provide high resolution and rapid scan, but the scan area is limited to the field of view of a microscope objective.

Another prior-art embodiment of confocal scanning-beam optical microscopes is the class of microscopes known as Nipkow Disk microscopes. The microscopes in this class were described by Gordon Kino[7], and a particularly simple and useful embodiment is the real time scanning optical microscope described in FIG. 2 of Kino's paper. These microscopes are different from the confocal microscope already described in that a large number of pinholes in a rotating disk are the source of a large number of scanning beams which are focused on the specimen simultaneously, and reflected or fluorescent light beams from these focused spots are detected simultaneously.

[7]G. S. Kino, "Efficiency in Nipkow Disk Microscopes", in "The Handbook of Biological Confocal Microscopy", pp. 93–99, IMR Press, Madison, Wis. 53706, Edited by J. Pawley, 1989.

OBJECTS OF THE INVENTION

It is an object of this invention to provide a scanning beam optical imaging system with a wide range of magnification, in which either or both confocal and non-confocal detectors can be used if required, and several different contrast mechanisms may be implemented, either one-at-a-time or in combination, including but not necessarily limited to the following: reflected light, photoluminescence (including spectrally-resolved photoluminescence), fluorescence (including spectrally-resolved fluorescence), fluorescence decay, scattered light, optical beam induced current or voltage, photoconductivity, scanning reflectance spectroscopy, photoreflectance spectroscopy, Raman effect imaging, and many others.

It is a further object of this invention to provide a scanning beam OBIC imaging or mapping system in which a high speed scan may be performed to image a large specimen, for example a whole wafer or detector array, and selected areas of the specimen can then be examined with high magnification and high resolution.

It is a further object of this invention to provide a photoluminescence imaging or mapping system in which a high speed scan may be performed to image a large semiconductor specimen, for example a wafer or epitaxial layer, and selected areas of the specimen can then be examined with high magnification and high resolution.

It is a further object of this invention to provide a confocal or non-confocal fluorescence imaging or mapping system in which a high speed scan may be performed to image a large biomedical specimen, and selected areas of the specimen can then be examined with high magnification and high resolution.

It is a further object of this invention to provide a novel method to parfocalize a microscope objective with a laser scan lens, such that both may be easily interchanged for use in a scanning beam imaging system.

DESCRIPTION OF THE INVENTION

The present invention is a practical scanning beam laser imaging system with a wide range of magnification, that combines in the same instrument the high resolution, high magnification capabilities of a confocal scanning laser microscope and the large area, rapid scan of the scanning laser macroscope.

Figure 3A:
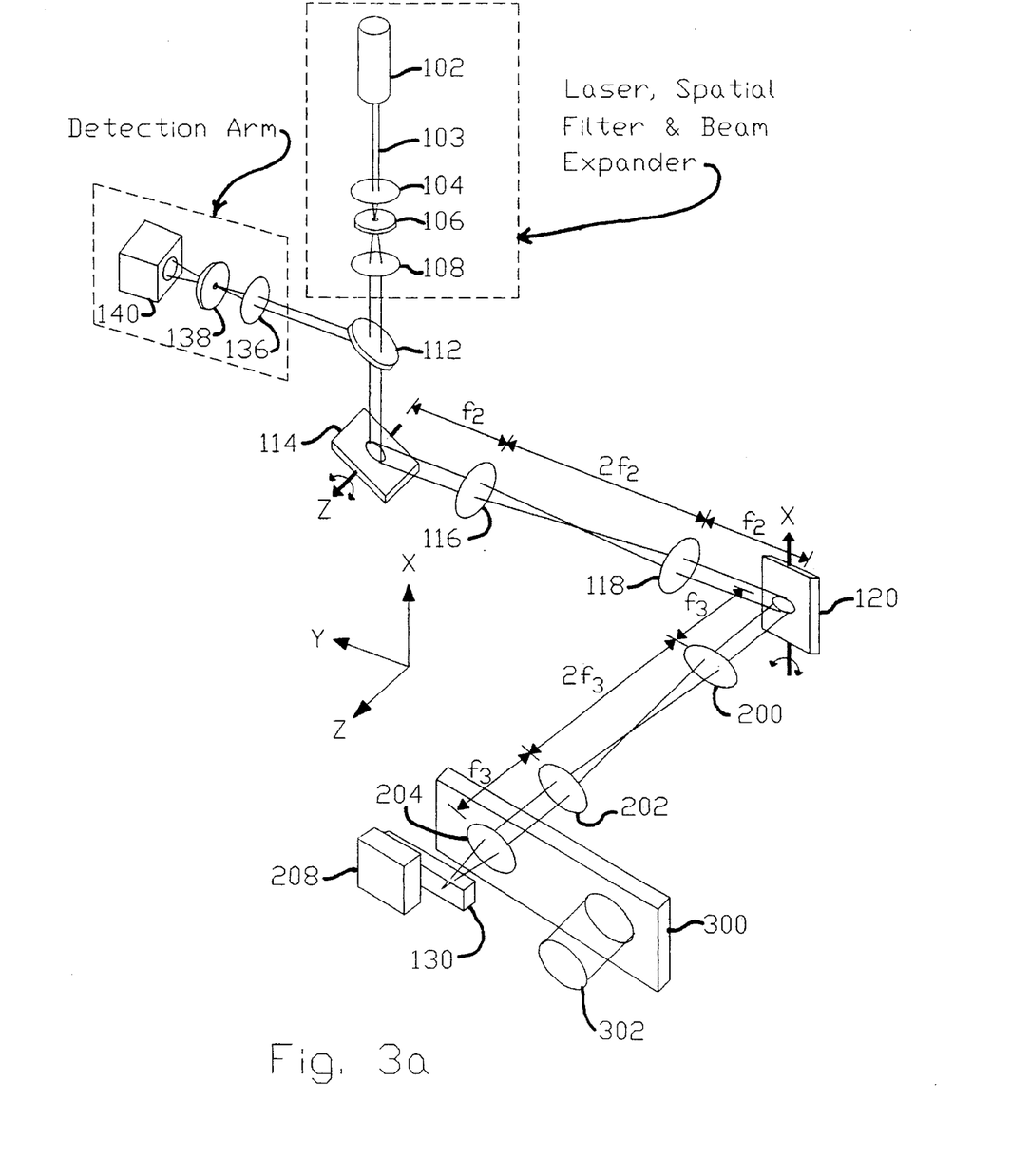
FIG. 3a shows a simplified perspective view of the first embodiment of the present invention, a confocal scanning laser microscope or imaging system with a very wide range of magnification.
Figure 3B:
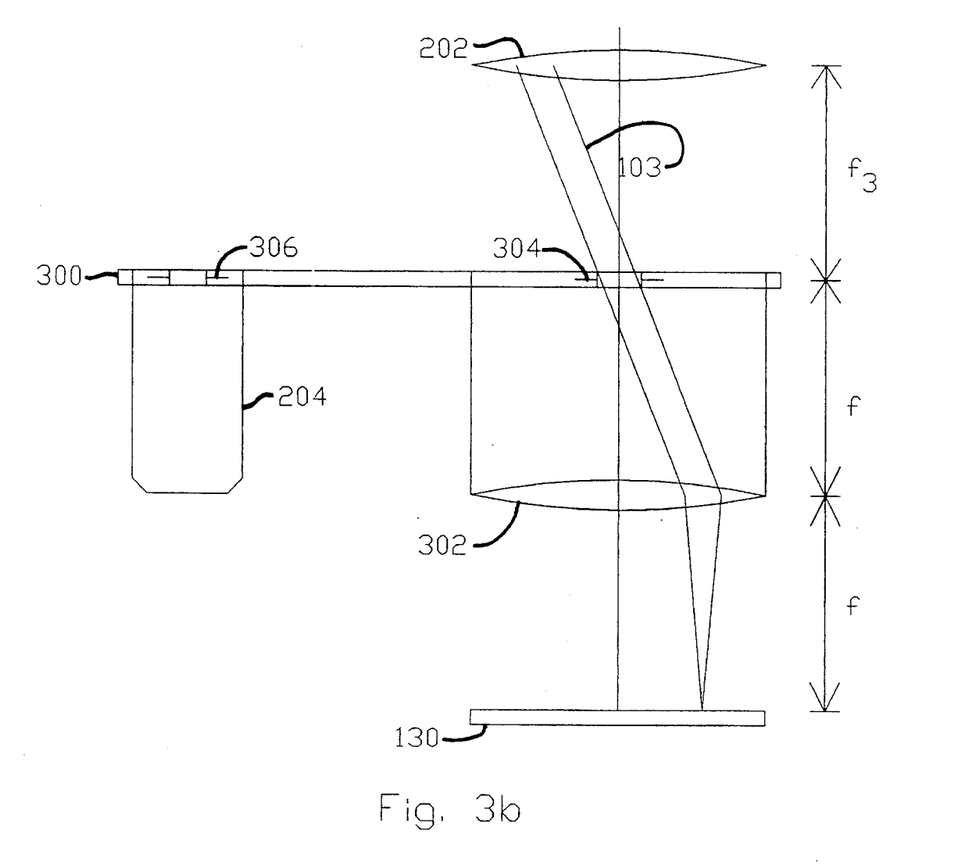
FIG. 3b shows a simplified side view of the turret or mechanical slide of FIG. 3a with microscope objective and scan lens mounted, the last lens of the scan system, and the specimen.

A first preferred embodiment of the present invention is shown in FIG. 3a. Laser beam 103 from laser 102 passes through a spatial filter and beam expander comprised of lens 104, pinhole 106 and lens 108. The beam then passes through beamsplitter 112 and impinges on first scanning mirror 114, which deflects it in the X-Y plane. Lenses 116 and 118 bring the beam back to the center of second scanning mirror 120, which adds a scan in the Y-Z plane. Lenses 200 and 202 bring the scanning beam back to cross the optic axis of the instrument at the position of the entrance pupil of microscope objective 204, which focuses the beam to a diffraction-limited spot in specimen 130. Light reflected, scattered or emitted from the specimen is collected by the microscope objective, passes back through the scan system (and is descanned), and is partially reflected by beamsplitter 112 into a confocal detection arm comprised of lens 136, pinhole 138 and detector 140. Pinhole 138 is placed at the focal point of lens 136, such that only the parallel bundle of rays parallel to the axis will pass through pinhole 138 and be detected. This means that only light originating at the focus spot in the specimen is detected. Scanning mirrors 114 and 120 are controlled to produce a raster scan on the specimen, the signal from detector 140 is detected by a frame grabber in synchronism with the scanning spot, and the image is displayed on a high resolution computer screen. Microscope objective 204 and laser scan lens 302 are both mounted on a turret or mechanical slide 300 to form a turret subassembly as shown in FIG. 3b, such that the turret or mechanical slide can be moved to place laser scan lens 302 in a position coaxial with the optic axis of the instrument, and such that entrance pupil 304 of the laser scan lens is at the position previously occupied by entrance pupil 306 of microscope objective 204, centered on the optic axis at the focal point of lens 202, the last lens in the scan system. Note that the scan lens shown in FIG. 3b is a simple singlet of focal length f placed a distance f from the specimen, and a distance f below the entrance pupil 304, which results in a very simple telecentric scan lens. Because better optical performance and a constant scan speed for the spot moving across the specimen are often required, more complicated telecentric f*theta scan lenses are usually used. Because these lenses are physically large, this may result in a large difference between the parfocal distance of the microscope objective and the scan lens.

Figure 4A:
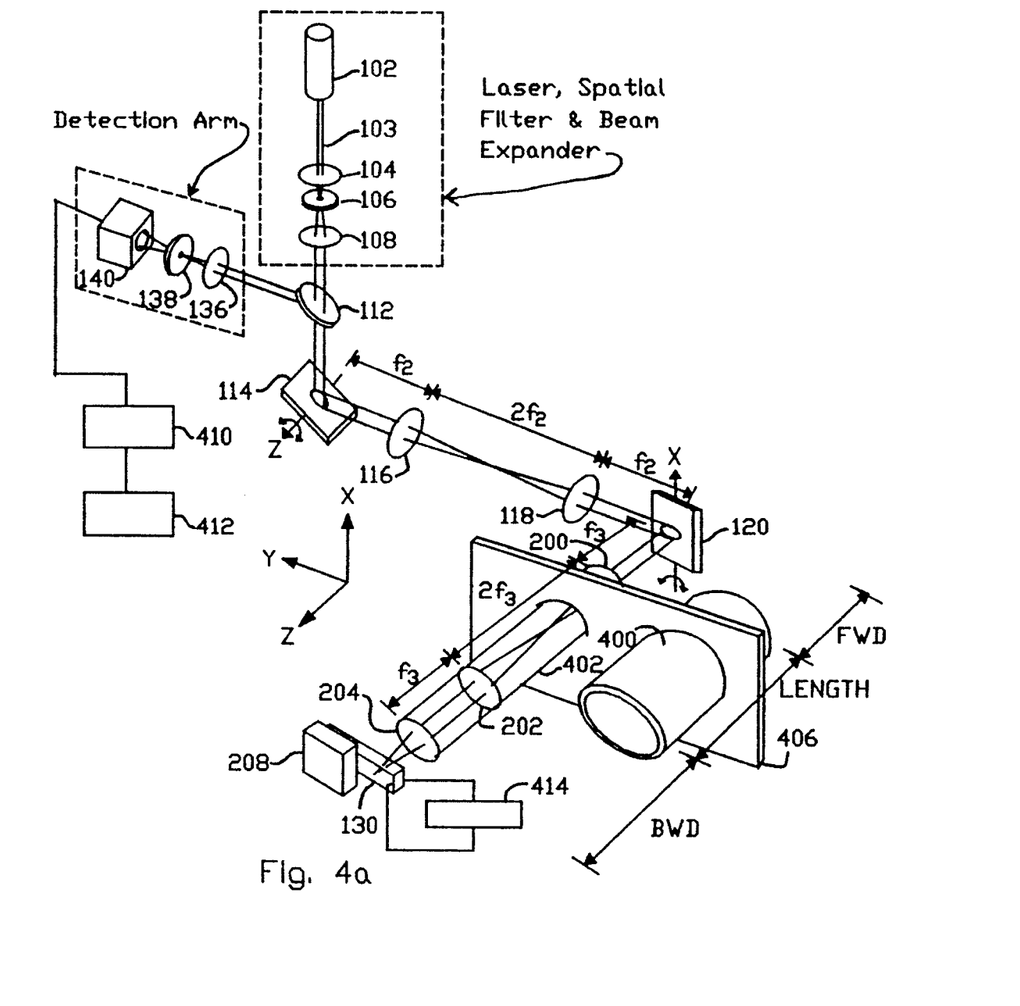
FIG. 4a shows a simplified perspective view of a second embodiment of the present invention, a confocal scanning laser microscope or imaging system with a very wide range of magnification, in which the microscope objective and laser scan lens are parfocalized.
Figure 4B:
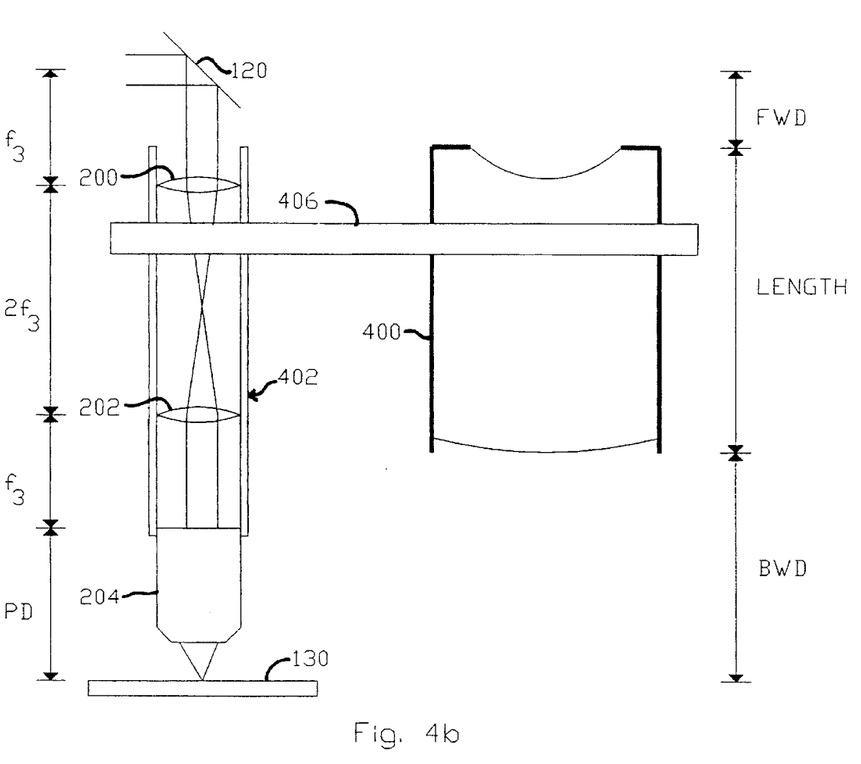
FIG. 4b shows a simplified side view of the turret or mechanical slide of FIG. 4a with attached laser scan lens and optical subassembly, the second scanning mirror of the scan system, and the specimen.

A second preferred embodiment of the present invention is shown in FIG. 4a. Laser beam 103 from laser 102 passes through a spatial filter and beam expander comprised of lens 104, pinhole 106 and lens 108. The beam then passes through beamsplitter 112 and impinges on first scanning mirror 114, which scans the beam in the X-Y plane. Lenses 116 and 118 bring the beam back to the center of second scanning mirror 120, which adds a scan in the Y-Z plane. Lenses 200 and 202 bring the beam back to cross the optic axis of the instrument as the beam enters the entrance pupil of microscope objective 204. Light reflected, scattered or emitted from the focused spot in specimen 130 is collected by microscope objective 204, passes back through lenses 202 and 200 and through the scan system, here comprised of scanning mirrors 114 and 120 and lenses 116 and 118, is partially reflected by beamsplitter 112 into the confocal detection arm and is detected. The signal from detector 140 is digitized using a frame grabber 410 as the raster scan proceeds, and the image is displayed on a high resolution computer screen 412. A high resolution image of a small area of specimen 130 is recorded using microscope objective 204 and lenses 200 and 202. In order to record a lower resolution image of a much larger area of the specimen, telecentric f*theta scan lens 400 is interchanged with optical subassembly 402, comprised of microscope objective 204 and lenses 200 and 202, which enables a much larger area of the specimen to be scanned than was possible using the microscope objective. Both f*theta scan lens 400 and optical subassembly 402 are shown in FIG. 4a rigidly attached to a mechanical slide or turret 406, which enables their positions to be interchanged. This arrangement of optical subassembly 402, mechanical slide or turret 406 and f*theta scan lens 400 is shown in FIG. 4b. The distance from the center of scanning mirror 120 to the focal plane of the f*theta lens equals FWD+LENGTH+BWD, where FWD is the front working distance of the f*theta lens, LENGTH is the length of the lens barrel, and BWD is the back working distance of the f*theta lens. The distance from the center of scanning mirror 120 to the focal plane of the microscope objective equals $4f_3+PD$, where $f_3$ is the focal length of lenses 200 and 202, and PD is the distance from the entrance pupil of microscope objective 204 to its focal plane. If the value of $f_3$ is chosen such that $4f_3+PD=FWD+LENGTH+BWD$, then the optical subassembly and the f*theta lens are parfocal. (Note: The scan angle and beam width entering the entrance pupil of microscope objective 204 can be changed by using lenses 200 and 202 with different focal lengths, placed such that lens 200 is a distance equal to its focal length from scanning mirror 120, lens 202 is a distance equal to its focal length from the entrance pupil of microscope objective 204, and the two lenses are a distance apart equal to the sum of their focal lengths. As long as the total distance from scanning mirror 120 to the entrance pupil of microscope objective 204 is unchanged, the optical subassembly and the f*theta lens will remain parfocal.) (Note 2: If different microscope objectives are required, a turret holding the different microscope objectives can be mounted at the bottom of the tube that forms the barrel of optical subassembly 402 in FIG. 4b.)

The imaging systems shown in FIGS. 3 and 4 can also be used for Optical Beam Induced Current (OBIC) imaging and measurements. For OBIC imaging, no reflected light detector is required, so the confocal detection arm comprised of lens 136, pinhole 138 and detector 140 can be removed, as can beamsplitter 112. OBIC detection is performed by connecting OBIC amplifier 414 (usually a current-to-voltage converter) to the specimen to measure the optical beam induced current or voltage, and digitizing the signal from this amplifier as the scan proceeds. Because no reflected light from the specimen is detected for OBIC imaging, the laser scan lens need not be telecentric, but an f*theta lens is appropriate since it will provide a linear scan across the specimen when scanning mirrors that move at constant angular velocity are used.

The imaging systems shown in FIGS. 3 and 4 can also be used for fluorescence and photoluminescence imaging. One possible embodiment for fluorescence or photoluminescence imaging is as follows: 1. Replace beamsplitter 112 with a dichroic beamsplitter to reflect the longer-wavelength fluorescence or photoluminescence returning from the specimen into the confocal detection arm, while allowing reflected light, at the laser wavelength, to pass through. 2. A non-confocal detector comprising beamsplitter 152, condenser lens 154 and detector 156 (as shown in FIG. 1) can be rigidly mounted to the bottom of the laser scan lens to provide a large numerical aperture, non-confocal detector for use with the laser scan lens. If beamsplitter 152 is a dichroic beamsplitter, detector 156 becomes a very efficient detector for non-confocal fluorescence or photoluminescence.

A further embodiment of the present invention is based on the Nipkow disk microscope. A laser scan lens can be used in such a microscope by adding a focusing lens between the Nipkow disk and the laser scan lens such that the focusing lens is placed a distance equal to its focal length below the Nipkow disk and an equal distance above the entrance pupil of the laser scan lens. If the laser scan lens and focusing lens are rigidly attached together, and mounted on a turret along with the microscope objective of the Nipkow disk microscope, the result is a Nipkow disk microscope with a wide range of magnification.

All of the embodiments shown in the figures are based on an infinity-corrected optical design, however non-infinity-corrected versions are also possible. All of the embodiments shown in the figures use a laser light source, however non-laser sources can also be used. All of the embodiments shown in the figures use a pair of scanning mirrors, however scan systems comprising other scan elements (for example acousto-optic deflectors, rotating polygon scanners, holographic scanners, Nipkow disks, etc.) and other optical combinations can also be used. Simple scan lenses, f*theta scan lenses, and telecentric f*theta scan lenses, as well as other refracting and reflecting lenses, can also be used. In this document, a pinhole is defined as a small aperture of circular, square or rectangular cross-section, including a slit.

Several embodiments of a novel scanning beam optical imaging system have been disclosed, each of which has a much wider range of magnification than previously available using either a scanning beam laser microscope or a scanning beam laser macroscope. A method of parfocalizing a micro scope objective, so that it can be exchanged with a laser scan lens in a scanning beam imaging system without refocusing, has also been disclosed.

Having described preferred embodiments of the new scanning laser microscope with a wide range of magnification, constructed in accordance with the present invention, it is believed that other modifications, variations, and changes will be suggested to those skilled in the art in view of the teachings set forth herein. It is therefore to be understood that all such variations, modifications, and changes are believed to fall within the scope of the present invention as defined by the appended claims.

I claim:

1. A confocal scanning beam microscope or imaging system with a wide range of magnification comprising:

means for supporting a specimen to be observed and measured;

an illumination source for producing a light beam directed along an optical path toward said specimen;

a microscope objective;

a scan lens;

means for interchanging said :microscope objective and said telecentric scan lens, such that either said microscope objective or said telecentric scan lens can be moved into position to focus the light beam to a diffraction-limited spot in a prescribed specimen plane;

means for scanning the light beam to move the diffraction-limited spot in a predetermined scan pattern on said specimen plane:

a detection arm for receiving light reflected, scattered or emitted from said diffraction-limited spot in said specimen plane comprising a pinhole and a focusing lens for obtaining a focal point for confocal detection of the light returning from said specimen, a detector placed behind said pinhole, whereby confocal image data can be measured, a first beamsplitter directing light returning from said specimen into said detection arm; and means for recording and displaying a signal from said detector.

2. The confocal scanning beam microscope or imaging system of claim 1 wherein said microscope objective is part of an optical subassembly which further comprises a first focusing lens and a second focusing lens, arranged such that the scanning beam crosses an optic axis of the confocal scanning beam microscope or imaging system as it enters an entrance pupil of said microscope objective, and whose focal lengths are chosen such that the microscope objective is parfocal with the scan lens.

3. The confocal scanning beam microscope or imaging system of claim 2 wherein said specimen is a semiconductor specimen and further comprising a means for measuring optical beam induced current.

4. The confocal scanning beam microscope or imaging system of claim 2 wherein said telecentric scan lens is a f*theta lens.

5. The confocal scanning beam microscope or imaging system of claim 2 wherein said beamsplitter is a dichroic beamsplitter, whereby light of longer wavelength than a longest wavelength from the illumination source is directed into said detection arm and light having the same wavelengths as the illumination source passes through said dichroic beamsplitter, thus enhancing fluorescence or photoluminescence detection.

6. The confocal scanning beam microscope or imaging system of claim 5 wherein said scan lens is a telecentric f*theta lens.

7. An optical beam induced current scanning beam microscope or mapping system with a wide range of magnification comprising:

means for supporting a specimen to be observed and measured;

an illumination source for producing a light beam directed along an optical path toward said specimen;

a microscope objective;

a scan lens;

means for interchanging said microscope objective and said scan lens, such that either said microscope objective or said scan lens can be moved into position to focus the light beam to a diffraction-limited spot in a prescribed specimen plane;

means for scanning the light beam to move the diffraction-limited spot in a predetermined scan pattern on said specimen plane; and means for measuring, recording and displaying optical beam induced current.

8. The optical beam induced current scanning beam microscope or mapping system of claim 7 wherein said microscope objective is part of an optical subassembly which further comprises a first focusing lens and a second focusing lens, arranged such that the scanning beam crosses an optic axis of the optical beam induced current scanning beam microscope or mapping system as it enters an entrance pupil of said microscope objective, and whose focal lengths are chosen such that the microscope objective is parfocal with the scan lens.

9. The optical beam induced current scanning beam laser microscope or mapping system of claim 8 wherein said scan lens is an f*theta laser scan lens.

* * * * *